(12) United States Patent
Giura et al.

(10) Patent No.: US 11,902,315 B2
(45) Date of Patent: Feb. 13, 2024

(54) PRIVACY PRESERVING VULNERABILITY DETECTION FOR DEVICES

(71) Applicant: AT&T Intellectual Property I, L.P., Atlanta, GA (US)

(72) Inventors: Paul Giura, Cohoes, NY (US); Mikhail Istomin, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 335 days.

(21) Appl. No.: 17/466,084

(22) Filed: Sep. 3, 2021

(65) Prior Publication Data
US 2023/0071309 A1     Mar. 9, 2023

(51) Int. Cl.
*H04L 9/40*    (2022.01)
(52) U.S. Cl.
CPC ...... *H04L 63/1433* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 11,675,816 B1 * | 6/2023 | Chandrasekharan | G06N 20/00 707/737 |
| 2022/0417270 A1 * | 12/2022 | Shua | H04L 63/1441 |

* cited by examiner

*Primary Examiner* — Cai Y Chen
(74) *Attorney, Agent, or Firm* — Guntin & Gust, PLC; Atanu Das

(57) ABSTRACT

A method for privacy preserving vulnerability detection for devices. In an example, an apparatus may include a processor and memory coupled with the processor that effectuates operations. The operations may include receiving a type of a device; receiving a feature for the device; creating a first hash value based on the device type and the feature; receiving an indication that the first hash value matches a second hash value; and based on the indication that the first hash value matches the second hash function, sending an alert that the device has a vulnerability.

20 Claims, 4 Drawing Sheets

PRIVACY PRESERVING VULNERABILITY DETECTION FOR DEVICES

BACKGROUND

Computer security, cybersecurity, or information technology security (IT security) is the protection of computer systems and networks from information disclosure, theft of or damage to their hardware, software, or electronic data, as well as from the disruption or misdirection of the services they provide.

The field is becoming increasingly significant due to the increased reliance on computer systems, the Internet and wireless network standards such as Bluetooth and Wi-Fi, and due to the growth of "smart" devices, including smartphones, televisions, and the various devices that constitute the "Internet of things".

This background information is provided to reveal information believed by the applicant to be of possible relevance. No admission is necessarily intended, nor should be construed, that any of the preceding information constitutes prior art.

SUMMARY

With the increase in the number and types of devices connected to the Internet via residential gateways (e.g., Wi-Fi routers, modems, access points, etc.), the task of keeping track of possible vulnerabilities or detect new compromises for each connected device is becoming increasingly difficult. Disclosed herein is a gateway, that has direct access to the connected devices (lightbulbs, IP cameras, voice assistants, smart plugs, or Wi-Fi thermostats, etc.) and can collect scanning and other traffic information locally. The disclosed mechanism may identify the vulnerabilities of devices connected by using a small amount of metadata collected at the gateway.

In an example, an apparatus may include a processor and memory coupled with the processor that effectuates operations. The operations may include receiving a type of a device; receiving a feature for the device; creating a first set of hash function values based on the type of the device and the feature of the device; receiving an indication that the first set of hash function values matches a second set of hash function values; and based on the indication that the first set of hash function values matches the second set of hash function values, sending an alert that the device has a vulnerability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The disclosed method may provide privacy by using cryptographic constructs on collected data. With this approach only a certain fingerprint of the device, built using secure one-way cryptographic hash functions, is sent to a backend system for querying a bloom filter based data structure. If the result of the query indicates the device features are not normal or appear in a set that includes an indication of compromise, the agent on the gateway may take the appropriate measure (e.g., auto-mitigate or send an alert, such as email, text, TV banner, blinking led on gateway, etc.). Privacy may be provided by not revealing information about the device or its service outside the residential gateway, not even to the service provider.

Figure 1:
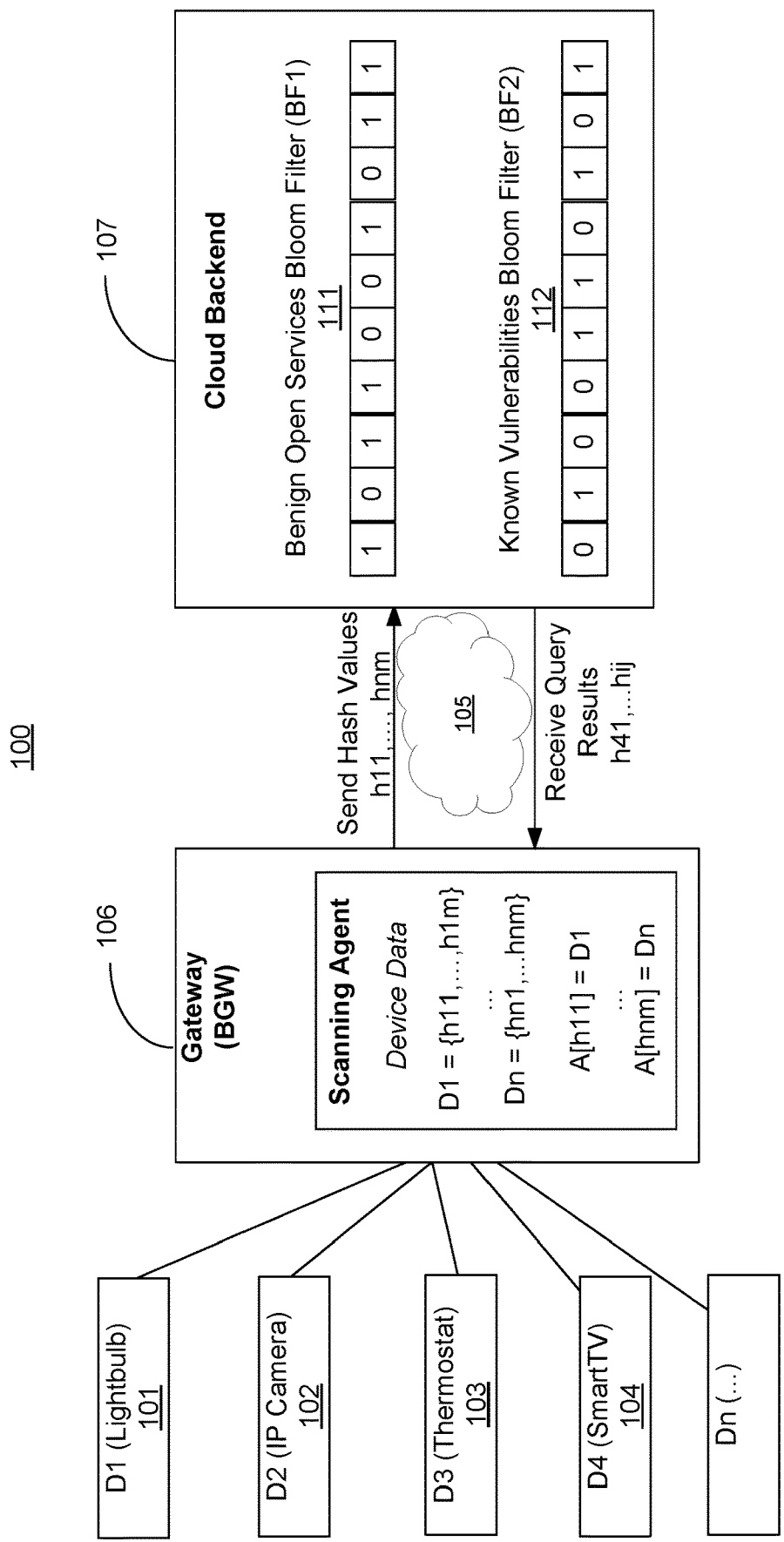
FIG. 1 illustrates an exemplary system for implementing privacy preserving vulnerability detection for devices.

FIG. 1 illustrates an exemplary system for vulnerability detection for broadband devices, among other things. System 100 may include internet of things (IoT) devices, such as lightbulb 101, IP camera 102, thermostat 103, or smartTV 104. The IoT devices may be communicatively connected with gateway 106, which may be a base station gateway (BGW) and may include a scanning agent. Gateway 106 may be communicatively connected with cloud backend 107 via network 105. Cloud backend 107 may include bloom filter (BF) 111 and BF 112 that may help to detect security issues with lightbulb 101, IP camera 102, thermostat 103, smartTV 104, or other IoT devices.

Figure 2:
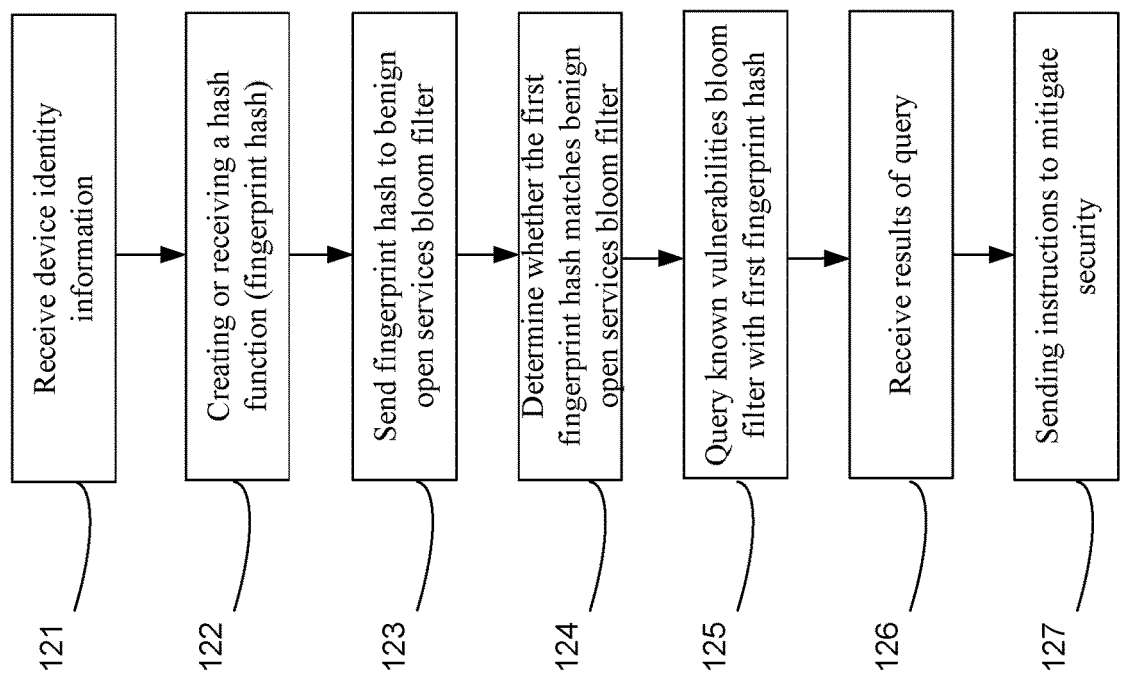
FIG. 2 illustrates an exemplary method for implementing privacy preserving vulnerability detection for devices.

FIG. 2 illustrates an exemplary method for vulnerability detection for broadband devices. At step 121, receive device identity information from lightbulb 101 (or other devices). Once a lightbulb 101 is connected to a network access point (AP), or Internet gateway (e.g., gateway 106), lightbulb 101 usually acquires a device identity (e.g., also includes a network identity), such as an internet protocol (IP) address or another identifier. During the initial exchange, lightbulb 101 may also announce its manufacturer or device type. If this is not the case, additional scanning may be performed that may reveal the identity or services run on lightbulb 101.

At step 122, creating or receiving a hash function (e.g., on-way hash functions), which may be considered a "device fingerprint" (fingerprint hash). The hash function may be applied to the type of device and a feature (e.g., port numbers open, protocols used, IP addresses contacted, etc.), or the like combination. Type of device can be treated as a feature, but it may also represent a category for possible feature sets in order to compare same device type features between themselves. For example, smartTV 104 may have somewhat different set of features from lightbulb 101. As such for example, lightbulb 101 is unlikely to have settings/controls for speaker volume. Generally, gateway 106 is positioned between lightbulb 101 and the Internet, and may act as a security monitoring point for lightbulb 101. As disclosed in more detail herein, gateway 106 may execute security protection functions for devices, such as lightbulb 106, that connect with gateway 106.

With continued reference to step 122, there may be a scanning agent that has a process running that captures the data from the connected devices ($D_1, \ldots, D_n$) and creates a set of m hash values ($h_{i1}, \ldots, h_{im}$) for each device $D_i$, based on the input $t_i + f_{ij}$, where $t_i$ is a device type (e.g., "Manufacturer A" camera, "Manufacturer B" lightbulb, etc.) and $f_{ij}$ is j-th feature for the device. The scanning agent may be a container-based agent deployed on gateway 106. Additionally, the process may create an associative array that maps the hash values back to the device identity $D_i$, in order to identify the vulnerable devices indicated by the response of the query.

At step 123, after at least the first fingerprint hash obtained at step 122, the at least first fingerprint hash may be sent to cloud backend 107 that includes the benign open services bloom filter, BF 111. BF 111 may be constructed by inserting into it the known benign services for the devices that is possible to be connected to the BGW in the registration phase. BF 111 may be created by a service provider and may be updated by users or by the service provider over time. Benign service may be considered an action that is expected (e.g., well known) to be there for object in question. Non benign would be an action that should not be there. Whether something is benign or not may be predetermined or determined using machine learning or the like (e.g., white listed or black listed). In an example, smartTV 104 may be expected to periodically connect to its manufacturer servers, e.g. check for firmware updates, so that may be determined as a benign behavior. On the other hand, if the same smartTV 104 suddenly starts listening on telnet port (23/TCP) that may be determined not benign.

With reference to step 123 for additional perspective, a simple BF 111 may be an array of 1 and 0 (or integers depending on implementation). In an example scenario, fingerprint defines what elements in said array need to be 1 for a match. Say a specific open port when hashed may point at elements 3, 8, 22. To insert said fingerprint into BF 111, bits 3, 8, 22 would be flipped to 1. To check if that fingerprint is in BF, values at indexes 3, 8, 22 would be retrieved and if all of them are is there would be a reply of True (e.g., Yes) returned, otherwise False (e.g., No).

At step 124, there is a determination of whether the at least first fingerprint hash matches what is expected to be open using BF 111. If there is a match, then an indication may be sent to gateway 106. If there is no match, then step 125 may be executed. If there is no match, then BF 112 is queried to check against known vulnerabilities.

At step 125, a second bloom filter is queried for the same hash value. The second bloom filter is the known vulnerabilities bloom filter, BF 112. BF 112 may be queried after step 124 when no hash value of BF 111 matches the first fingerprint hash. BF 112 may be constructed by inserting the published or discovered vulnerabilities features (e.g., vulnerable ports, new malicious services, bad IPs, etc.), along with the corresponding device type. A malicious service may be a functionality that should not be there and was likely inserted/added with malicious purposes. For example, a code injected into smartTV 104 that would cause it to open a port (e.g., 23 (telnet) or 1337), that would allow someone talking to said port gain sensitive information (e.g. what user is currently watching, credentials for user's streaming services), take control over TV (change channels, volume etc.), or send commands to it (e.g. force it to act as a bot in DDoS attack).

After a negative response to the first fingerprint hash when compared to BF 111 and a positive response (e.g., a match) from BF 112 compared with the first fingerprint hash, at step 126, the results may be received by the querying agent of gateway 106. Note that there may be an attempt to save bandwidth and communication overhead, therefore just the hash values that are found in BF 112 may be sent back as responses, or a representation of those (e.g., a bit array of matches, such as array A).

At step 127, after receiving the responses of step 126, sending instructions to mitigate security or other problems for devices that have the corresponding hash values reported by the associative array A. Depending on the implementation one or more mitigation actions may be pursued. For example, a user device may be messaged via the preferred communication channel about the potential vulnerability or compromise for the identified device(s). In another example, there may be auto mitigation by taking a direct action on the device (e.g., restart the identified device, trigger an auto software update, etc.).

It is contemplated herein that the presented method may be extended to some or all of the population of devices connected with an Internet service via gateways. In this manner the privacy assurance may be strengthen by aggregating substantially more device fingerprints into the bloom filter data structure. For example, multiple gateways (e.g., thousands of gateways 106) may connect with one or two cloud backends with a corresponding one or two BF 111 or BF 112. The memory requirements for BF 111 and BF 112 may be large, but relatively small compared to dedicating separate individual bloom filters for each gateway 106. Moreover, hosting the bloom filters into a cloud instance may provide increased efficiency, performance, or flexibility for the expected increasing number of diverse devices.

Figure 3:
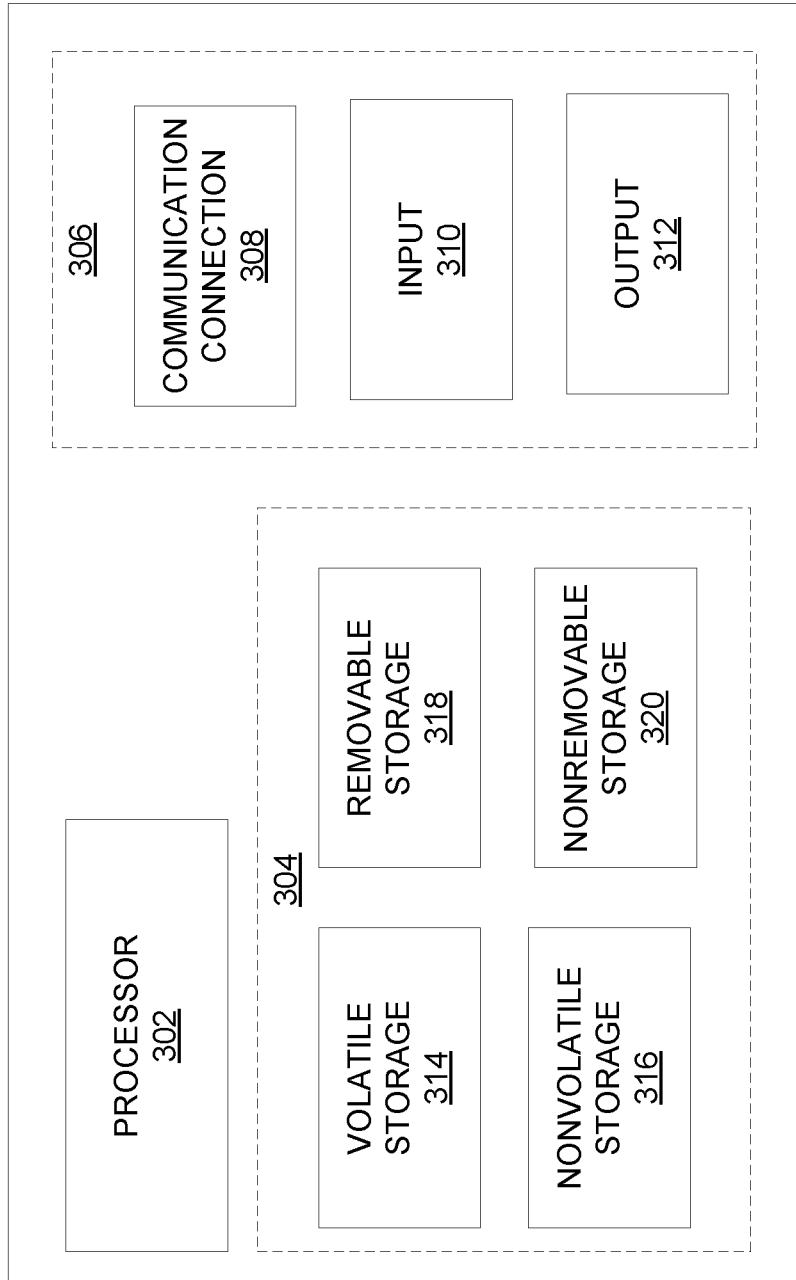
FIG. 3 illustrates a schematic of an exemplary network device.

FIG. 3 is a block diagram of network device 300 that may be connected to or comprise a component of system 100. The disclosed devices of system 100 may vary and may include a laptop, tablet, autonomous vehicle (e.g., SAE Intl level 3 to level 5 automation), or mobile phone, among other things. Network device 300 may include hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
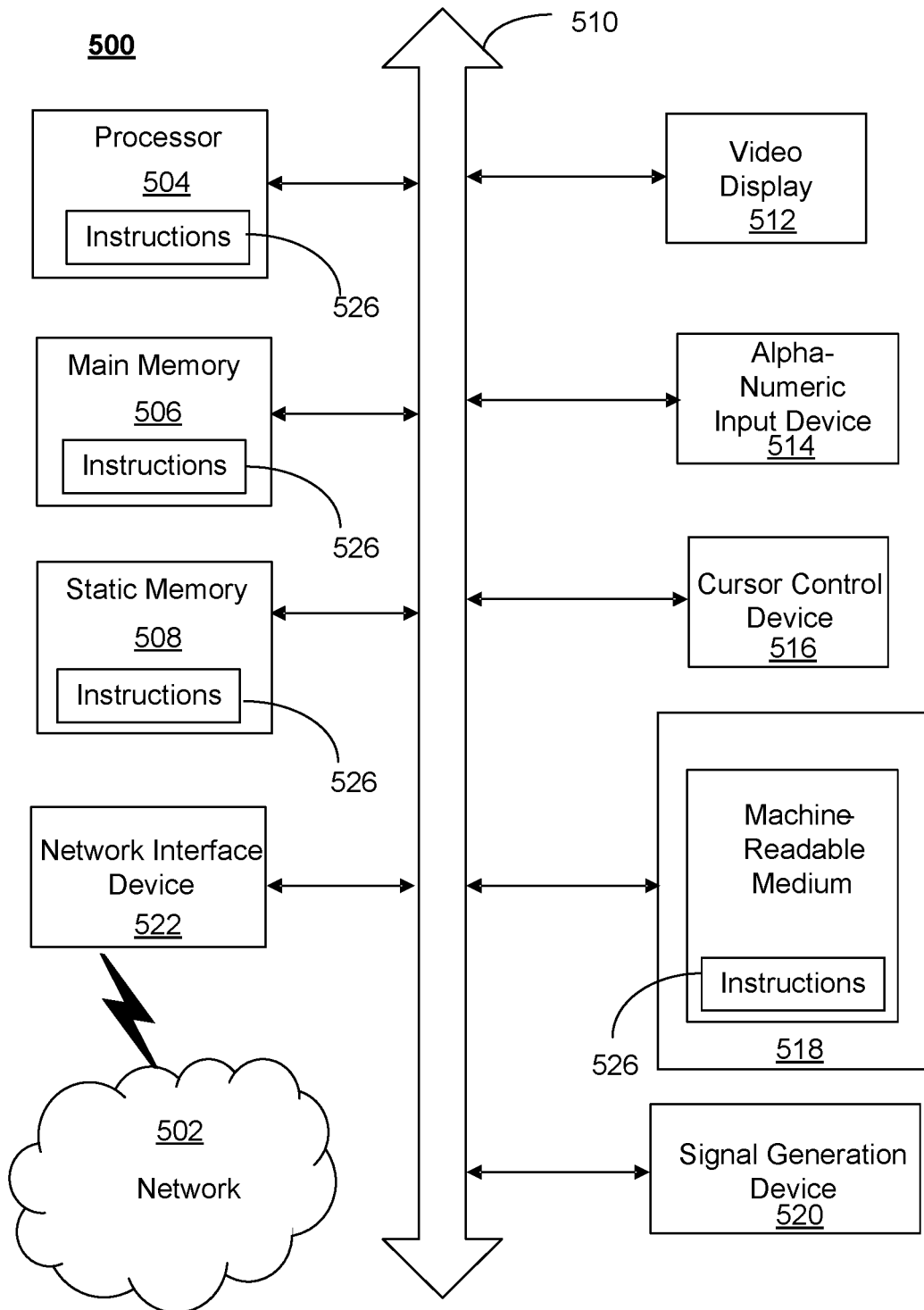
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, lightbulb 101, IP camera 102, thermostat 103, smartTV 104, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which privacy preserving vulnerability detection for devices alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—privacy preserving vulnerability detection for devices—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for receiving a type of a device; receiving a feature for the device; creating a first set of hash values by hashing the type of the device and the features of the device; receiving an indication that the first set of hash values matches a second set of hash values; and based on the indication that the first set of hash values matches the second set of hash values, sending an alert that the device has a vulnerability. The alert may include instructions to automatically mitigate the vulnerability. The feature may include a port number or a protocol. The second set of hash values may be associated with a benign open services bloom filter. The second set of hash values may be associated with a known vulnerabilities bloom filter. In an example, in order to have a match we have to have set to 1 the Bloom Filter position the hash function value indicates. For every device type and feature hash values may be created by computing the hash function on those features. Cryptographic hash functions (aka one-way-hash functions) may be selected for their capability to avoid collisions, that is, they provide different values for different features and is unlikely there can be a reconstruct of the feature that was hashed, starting from the value produced by the function. In this way the False Positives of Bloom Filters may be significantly reduced, and False Positives of the whole system may be reduced overall. All combinations in this paragraph (including the removal or addition of steps) are contemplated in a manner that is consistent with the other portions of the detailed description.

What is claimed:

1. A method comprising:
   receiving a type of a device;
   receiving a feature for the device;
   creating a first set of hash function values based on the type of the device and the feature of the device;
   receiving an indication that the first set of hash function values matches a second set of hash function values; and
   based on the indication that the first set of hash function values matches the second set of hash function values, sending an alert that the device has a vulnerability.

2. The method of claim 1, wherein the feature comprises a port number or a protocol.

3. The method of claim 1, wherein the second set of hash function values is associated with a benign open services bloom filter.

4. The method of claim 1, wherein the second set of hash function values is associated with a known vulnerabilities bloom filter.

5. The method of claim 1, wherein the received indication comprises hash values.

6. The method of claim 1, wherein the received indication comprises a bit array.

7. The method of claim 1, wherein the alert comprises instructions to automatically mitigate the vulnerability.

8. The method of claim 1, wherein the vulnerability is malicious software or defective software.

9. An apparatus comprising:
a processor; and
a memory coupled with the processor, the memory storing executable instructions that when executed by the processor cause the processor to effectuate operations comprising:
receiving a type of a device;
receiving a feature for the device;
creating a first set of hash function values based on the type of the device and the feature of the device;
receiving an indication that the first set of hash function values matches a second set of hash function values; and
based on the indication that the first set of hash function values matches the second set of hash function values, sending an alert that the device has a vulnerability.

10. The apparatus of claim 9, wherein the feature comprises a port number or a protocol.

11. The apparatus of claim 9, wherein the second set of hash function values is associated with a benign open services bloom filter.

12. The apparatus of claim 9, wherein the second set of hash function values is associated with a known vulnerabilities bloom filter.

13. The apparatus of claim 9, wherein the received indication comprises hash values.

14. The apparatus of claim 9, wherein the received indication comprises a bit array.

15. The apparatus of claim 9, wherein the alert comprises instructions to automatically mitigate the vulnerability.

16. The apparatus of claim 9, wherein the vulnerability is malicious software or defective software.

17. A computer readable storage medium storing computer executable instructions that when executed by a computing device cause said computing device to effectuate operations comprising:
receiving a type of a device;
receiving a feature for the device;
creating a first set of hash function values based on the type of the device and the feature of the device;
receiving an indication that the first set of hash function values matches a second set of hash function values; and
based on the indication that the first set of hash function values matches the second set of hash function values, sending an alert that the device has a vulnerability.

18. The computer readable storage medium of claim 17, wherein the feature comprises a port number or a protocol.

19. The computer readable storage medium of claim 17, wherein the second set of hash function values is associated with a known vulnerabilities bloom filter.

20. The computer readable storage medium of claim 17, wherein the received indication comprises a bit array.

\* \* \* \* \*